J. JONES.
MACHINE FOR PLANTING SEEDS, &c.

No. 2,303.                                              Patented Oct. 11, 1841.

3 Sheets—Sheet 3.

J. JONES.
MACHINE FOR PLANTING SEEDS, &c.

No. 2,303  Patented Oct. 11, 1841.

UNITED STATES PATENT OFFICE.

JOSEPH JONES, OF NEWTON TOWNSHIP, GLOUCESTER COUNTY, NEW JERSEY.

IMPROVEMENT IN PLANTING-MACHINES, CONSISTING OF A MODE OF ARRANGING THE VIBRATING SLIDE BY WHICH THE SEED IS DROPPED, &c.

Specification forming part of Letters Patent No. 2,303, dated October 11, 1841.

*To all whom it may concern:*

Be it known that I, JOSEPH JONES, of Newton township, Gloucester county, State of New Jersey, have invented a new and useful Improvement in the Machine for Planting Seeds and Grain, which is described as follows, reference being had to the annexed drawings of the same, making part of this specification.

Figure 1:
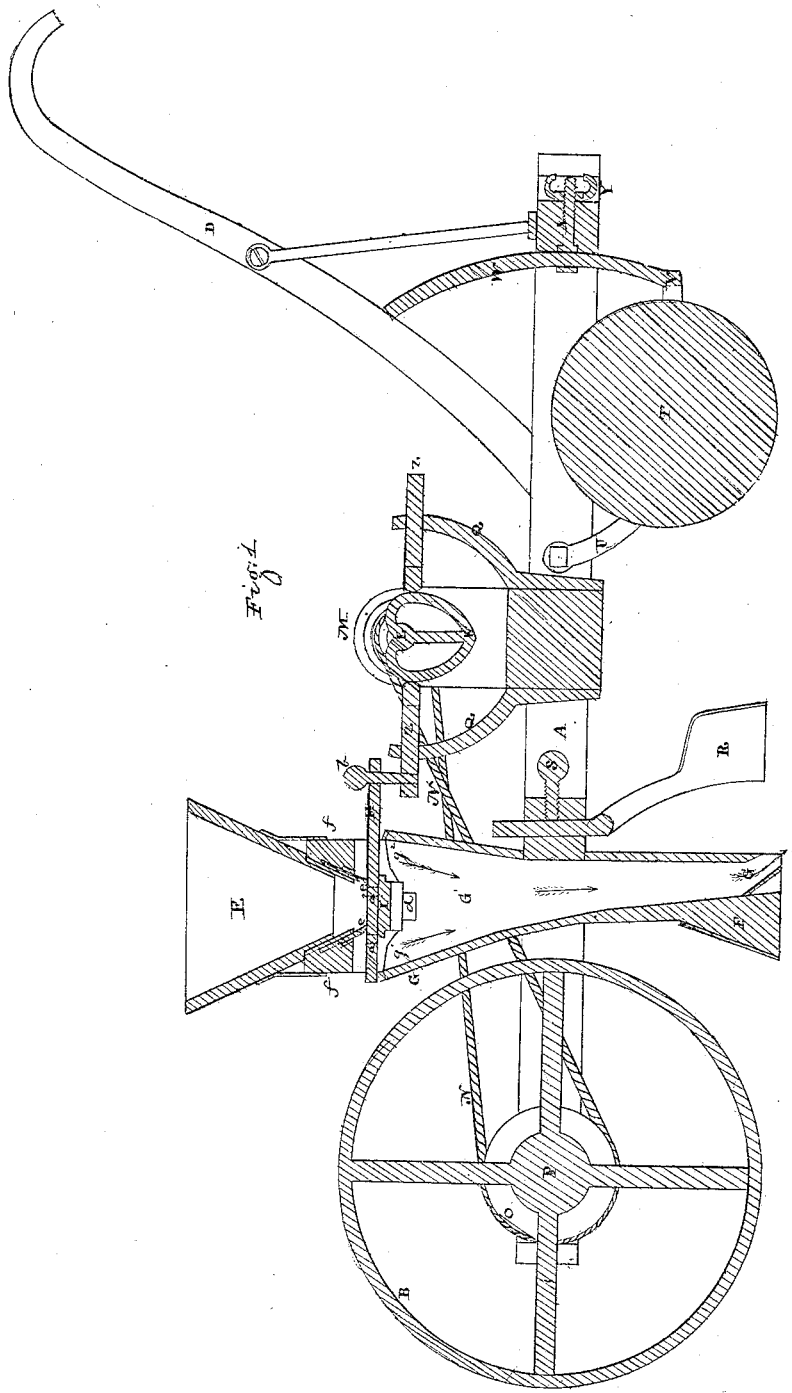
Figure 2:
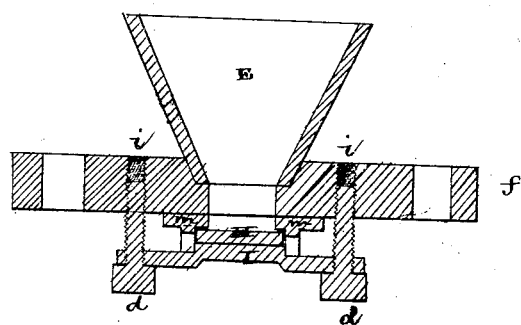
Figure 3:
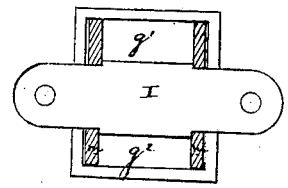
Figure 4:
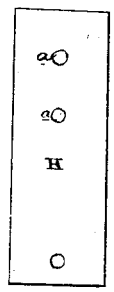
Figure 5:
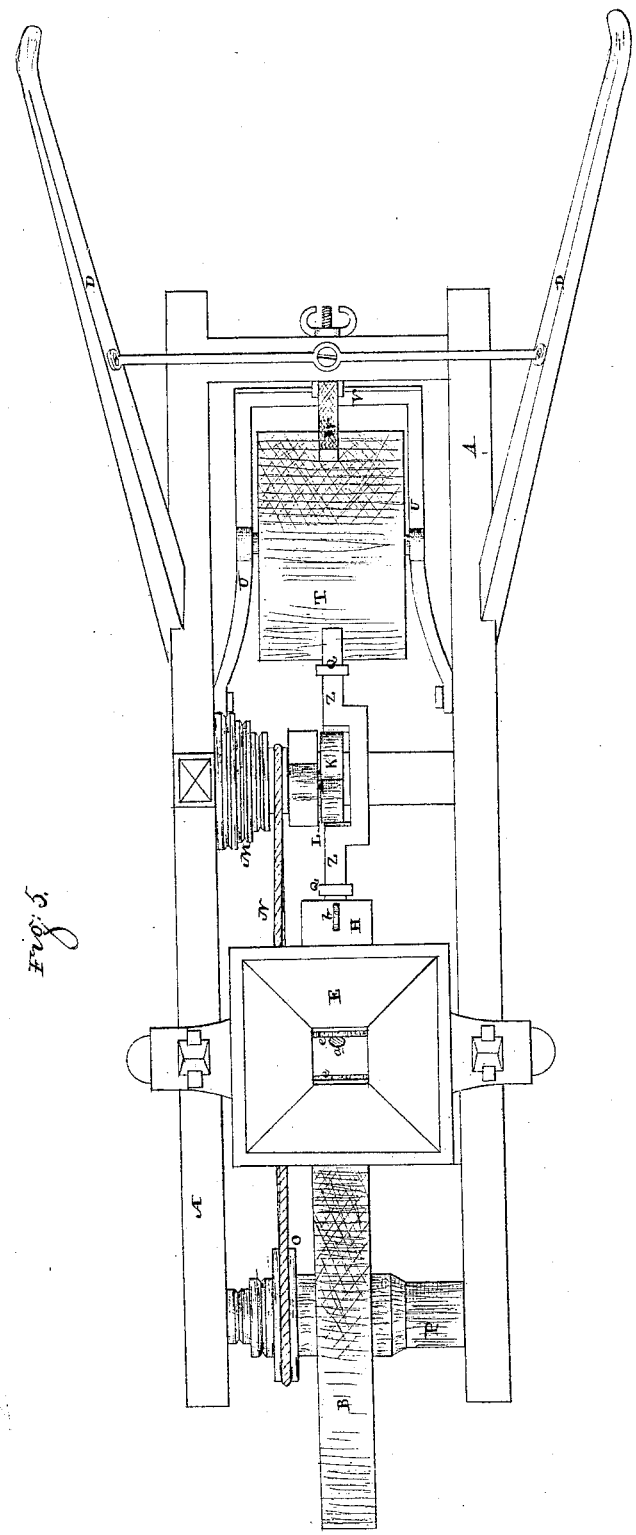

Figure 1 is a vertical longitudinal section of the machine through the center of the same. Fig. 2 is a vertical transverse section. Fig. 3 is a horizontal section through the upper part of the spout, showing the rest. Fig. 4 is a view of the slide. Fig. 5 is a top view of the machine.

Similar letters refer to corresponding parts in the figures.

This seed-planter is in several of its parts constructed like other machines in use for planting seed. The improvements are in those parts, hereinafter particularly described, which render the machine practicable and useful. It is composed of a horizontal rectangular frame, A, supported on the axle of a large forward propelling-wheel, B, and on that of a roller, T, at the rear. This frame contains and supports the several parts of the machine, and is made of any convenient size, strength, and material, and from near its rear end rise the handles D, by which the machine is guided.

The hopper E, into which the seed to be planted is deposited, is arranged in said frame A directly behind the propelling-wheel B and at the top of the standard of the plow F for opening the furrow to receive the seed, which standard and plow are made hollow from top to bottom, forming a spout, G, for conducting the seed from the hopper to the furrow, being previously received into an aperture, *a*, (represented in dotted lines in Fig. 1,) in the horizontal vibrating slide H, Figs. 1, 2, 3, and 4, the size of said aperture *a*, Fig. 4, being equal to the bulk of the number of grains or seed to be dropped. Said aperture, when receiving the grain, is brought directly over a solid plate, I, one-third the width of the spout G' in the standard G, on which plate the perforated slide H moves, and which prevents the descent of the seed until the slide is moved to the right or left, which brings the perforation in the slide over the open parts $g'$ $g^2$ of the spout not covered by the slide I, when the seed drops down the spout G' to the furrow, said slide being moved by a heart-wheel, K, fixed on a revolving axle, L, on which there are grooved pulleys M of various diameters, around which is passed a crossed band, N, which is also carried around a grooved pulley, O, on the axle P of the propelling-wheel B, said slide being moved by a connecting-bar, Z, attached to its rear end, the said sliding bar Z moving in rectangular openings in curved standards Q, rising from the frame A, to which they are secured.

The coverers R for covering the seed are arranged behind the plow F, and are made adjustable by a screw, S, so that they can be raised or lowered at pleasure.

The roller T, for rolling the seed and regulating the depth of the plowing, and for acting as a fulcrum in raising the driving-wheel from the ground, is arranged behind the coverers, and is attached loosely to the frame A by two curved arms, U, connected by a cross-bar, V, from which rises a segment, W, which passes through a mortise in the end of a horizontal screw-rod, X, passing through the end of the frame on which there is a nut, Y, which draws the segment W, when adjusted, in raising or lowering the roller, firmly against the frame A and holds it securely in the position desired. The roller also serves as a pivot or movable fulcrum on which to raise and turn the forward part of the machine in any direction required.

The perforated slide H for receiving the seed is attached to the sliding bar Z (moved by the heart-wheel K) by a vertical screw, *b*, so that the slide can be removed at pleasure when its place is to be supplied by another slide for a different kind of seed to be planted, there being various perforated slides for the various kinds of seed to be planted perforated accordingly. The one represented in the drawings is designed for planting corn, and therefore has two perforations, each carrying three grains of corn, one designed to drop the corn at the rear of the plate or rest I and the other in front of it, so that as one is dropping the other is filling. The said plate or rest I is raised or lowered by screws *d*, so as to enlarge or diminish the opening between it and the bottom of the hopper for the various thicknesses of slides to be used. Brushes *e e* are arranged at the bottom of the hopper for striking the seed or grain in the apertures of the slide, instead of using the lower edges of the hopper for that purpose, which would cut or bruise the grain or seed. The rest-board I is supported by the hanging screws $d\ d$, which screw into female screws $i\ i$ in the frame $f$ of the hopper E. Parallel guides $m\ m$ are fastened to the under side of the frame $f$, below the hopper, for guiding the slide H.

What I claim as my invention, and which I desire to secure by Letters Patent, is—

1. The method of combining the rest-board I with the spout and slide by arranging the rest-board I over the center of the spout $G'$ under the slide H, so as to leave a passage, $g'\ g^2$, at either side of said board for admitting the seed into the spout on both the forward and backward motion of the slide, and, in combination with said arrangement, the method of adjusting the rest-board I by means of the screws $d\ d$.

2. The combination of the arms U, segment W, and screws X, for adjusting the height of the roller, for causing the plow to enter the earth more or less, as well as for rolling, as before described.

JOSEPH JONES.

Witnesses:
WM. P. ELLIOT,
H. PALMER.